US009298763B1

(12) United States Patent
Zack et al.

(10) Patent No.: US 9,298,763 B1
(45) Date of Patent: Mar. 29, 2016

(54) METHODS FOR PROVIDING A PROFILE COMPLETION RECOMMENDATION MODULE

(71) Applicant: Google Inc., Mountain View, CA (US)

(72) Inventors: Shenaz Zack, Mountain View, CA (US); Karthik Murili Nagaraj, Mountain View, CA (US); Eric Cattell, Mountain View, CA (US); Snehal Patel, Mountain View, CA (US); Barbara Veloso Bacharach, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 178 days.

(21) Appl. No.: 14/198,445

(22) Filed: Mar. 5, 2014

Related U.S. Application Data

(60) Provisional application No. 61/773,781, filed on Mar. 6, 2013.

(51) Int. Cl.
G06F 17/30 (2006.01)
(52) U.S. Cl.
CPC .............................. G06F 17/30365 (2013.01)
(58) Field of Classification Search
CPC .............................................. G06F 17/30365
USPC .......................................................... 707/736
See application file for complete search history.

(56) References Cited

U.S. PATENT DOCUMENTS 5,584,025 A * 12/1996 Keithley ................ G06Q 30/00
707/752
5,710,884 A * 1/1998 Dedrick .................. H04L 29/06
709/217
5,848,396 A * 12/1998 Gerace ................... G06Q 30/02
705/14.49
5,978,799 A * 11/1999 Hirsch .............. G06F 17/30864
5,991,735 A * 11/1999 Gerace ................... G06Q 30/02
705/7.29
5,995,943 A * 11/1999 Bull .................. G06F 17/30067
705/14.39
6,014,634 A * 1/2000 Scroggie ................ G06Q 20/12
705/14.25
6,036,601 A * 3/2000 Heckel ................... G06Q 30/02
273/461
6,055,573 A * 4/2000 Gardenswartz ........ G06Q 30/02
709/219
6,119,933 A * 9/2000 Wong .................... G06Q 20/14
235/380
6,129,274 A * 10/2000 Suzuki ................... G06Q 20/20
235/380
6,256,633 B1 * 7/2001 Dharap ............. G06F 17/30867

(Continued)

OTHER PUBLICATIONS

Cutillo, Leucino Antonio, et al., "Safebook: A Privacy-Preserving Online Social Network Leveraging on Real-Life Trust", IEEE Communications Magazine, vol. 47, Issue 12, Dec. 2009, pp. 94-101.*

(Continued)

Primary Examiner — Robert Stevens
(74) Attorney, Agent, or Firm — Lowenstein Sandler LLP

(57) ABSTRACT

A method for completing profile of a user includes detecting user interactions at a property page. The user interactions may include social interactions and service-specific interactions. The user interactions are analyzed to determine the context of the interaction and/or data content associated with the user or friends of the user. User profile information is examined to determine which fields need to be filled and which fields need to be updated. Based on the examination of the user profile information and the analysis of the user interactions, a query/suggestion is presented in a user interface and is related to a specific field of the user profile that is to be filled. Response to the query/suggestion at the user interface is monitored and used to update the appropriate field in the user profile.

20 Claims, 17 Drawing Sheets

(56) References Cited

U.S. PATENT DOCUMENTS

| | | | | |
|---|---|---|---|---|
| 6,327,590 | B1* | 12/2001 | Chidlovskii | G06F 17/30867 707/734 |
| 6,343,287 | B1* | 1/2002 | Kumar | G06F 17/30557 |
| 6,571,216 | B1* | 5/2003 | Garg | G06Q 30/02 705/14.25 |
| 6,931,254 | B1* | 8/2005 | Egner | G06Q 30/0269 455/456.1 |
| 7,334,184 | B1* | 2/2008 | Simons | G06F 17/30867 715/234 |
| 8,234,193 | B2* | 7/2012 | Ransom | G06Q 30/02 705/14.1 |
| 2002/0019769 | A1* | 2/2002 | Barritz | G06Q 30/02 705/14.35 |
| 2002/0128908 | A1* | 9/2002 | Levin | G06Q 30/02 705/14.53 |
| 2006/0053058 | A1* | 3/2006 | Hotchkiss | G06Q 30/02 705/14.13 |
| 2009/0070219 | A1* | 3/2009 | D'Angelo | G06Q 10/10 705/14.56 |
| 2010/0070448 | A1* | 3/2010 | Omoigui | H01L 27/1463 706/47 |
| 2012/0109882 | A1* | 5/2012 | Bouse | H04L 67/306 707/607 |
| 2012/0124176 | A1* | 5/2012 | Curtis | G06Q 50/01 709/219 |
| 2012/0191716 | A1* | 7/2012 | Omoigui | H01L 27/1463 707/740 |
| 2012/0290950 | A1* | 11/2012 | Rapaport | H04L 51/32 715/753 |
| 2013/0124628 | A1* | 5/2013 | Weerasinghe | G06Q 50/01 709/204 |
| 2013/0166465 | A1* | 6/2013 | Barros | G06Q 10/1053 705/319 |

OTHER PUBLICATIONS

O'Leary, Daniel E., et al., "Enterprise Knowledge Management", IEEE Computer, vol. 31, Issue 3, Mar. 1998, pp. 54-61.*

Burke, Moira, et al., "Feed Me: Motivating Newcomer Contribution in Social Network Sites", CHI 2009—Social Networking Sites, Boston, MA, Apr. 7, 2009, pp. 945-954.*

Sharma, Rajesh, et al., "SuperNova: Super-peers Based Architecture for Decentralized Online Social Networks", COMSNETS 2012, Bangalore, India, Jan. 3-7, 2012, pp. 1-10.*

Mukherjee, Rajat, et al., "Enterprise Search: Tough Stuff", Queue, vol. 2, Issue 2, Apr. 2004, 11 pages.*

IEEE 100: The Authoritative Dictionary of IEEE Standards Terms, 7th Edition, IEEE Pres, New York, NY, © 2000, pp. 44, 46, 874 and 1242.*

Microsoft Computer Dictionary, 5th Edition, Microsoft Press, Redmond, WA, © 2002, pp. 33, 424 and 544.*

Farrell, Stephen, et al., "Socially Augmenting Employee Profiles with People-Tagging", UIST '07, Newport, RI, Oct. 7-10, 2007, pp. 91-100.*

Geyer, Werner, et al., "Recommending Topics for Self-Descriptions in Online User Profiles", RecSys '08, Lausanne, Switzerland, Oct. 23-25, 2008, pp. 59-66.*

* cited by examiner

METHODS FOR PROVIDING A PROFILE COMPLETION RECOMMENDATION MODULE

CLAIM OF PRIORITY

The present application claims the benefit of and priority, under 35 U.S.C. §119(e), to U.S. Provisional Patent Application No. 61/773,781, filed Mar. 6, 2013, entitled "Methods for Providing a Profile Completion Recommendation Module," the disclosure of which is incorporated herein by reference in its entirety.

BACKGROUND

1. Field of the Invention

The present disclosure relates to methods and computer programs for providing tools to complete a user's profile on a webpage.

2. Description of Related Art

The exponential growth of the Internet has resulted in numerous applications being provided by information service providers to access information on the Internet. The number of applications requesting user information has been steadily growing. With the advent and growing popularity of the social networks, users are being presented with additional applications that request user information and provide venues for presenting a user's profile. In some cases, a single information service provider or social media provider may host multiple applications each requiring their own set of profile related information from the user.

It is, therefore, not uncommon when users are reluctant/hesitant to provide the requested information or wary/tired of providing such information over and over again.

SUMMARY

Embodiments of the present disclosure provide methods, systems, and computer programs for providing a universal profile completion and recommendation module for gathering information about a user in a non-intrusive and safe manner.

In one embodiment, methods and logic are provided to solicit information from users and for processing this information in order to complete the users' profile. The information provided in the users profile can then be used to recommend better services to the user, for suggesting or for identifying social groups for establishing social connections, as well as suggest groups for social and business networking.

In one embodiment, a method for completing profile information using information provided in user interactions, is disclosed. The method includes the following method operations: detecting user interactions in a property page, the user interactions include user interactions associated with a user accessing the property page as well as interactions associated with social contacts of the user; analyzing user interactions to identify context; examining user profile data of a user to determine a field of information related to the context that needs to be filled or updated; generating a user interface with a suggestion/query related to the field, the suggestion/query including information from the context of the user interactions obtained from the analysis, the user interface with the suggestion/query returned to a client device for user action; and updating the field of information within the user profile data with information obtained from the user interface based on the user action, the updating contributing toward completion of user profile data of the user.

In one embodiment, user approval is obtained for some or all of the data collected from the users before processing the data for profile update.

In one embodiment, the user data that is used for profile completion is based on user actions that are visible to public. In this embodiment, user actions and/or data that is private is not considered for profile completion.

In one embodiment, the user interactions are obtained from within one or more properties hosted within an entity.

In one embodiment, the user interactions are obtained from one or more properties hosted on different entities, using an API. The API is used to collect information that is made public by the user or that is identified for sharing by the user.

In one embodiment, the user interactions identifying user data associated with a user whose profile data is sought for completion is obtained from one or more properties accessed through a property within an entity.

In one embodiment, the user interactions identifying user data associated with social contacts of a user whose profile data is sought for completion is obtained from one or more properties accessed through a property within an entity.

In one embodiment, the analysis of the user interactions are done periodically.

In one embodiment, the suggestion/query includes identifying one or more informational panels related to the field based on the information provided in the context, the informational panels being returned in the user interface for user action.

In one embodiment, the suggestion/query returned in the user interface includes a confirmation statement for user confirmation.

In one embodiment, the suggestion/query includes information related to the context identified from the analysis of user interaction, the suggestion/query directed toward confirmation of the information.

In one embodiment, the user interface includes a suggested user action to be performed for the suggestion/query contained therein.

In accordance with another embodiments, a method for completing profile information of a user in a property page, is provided. The method includes the following method operations: authenticating a user to an account on a social network; analyzing social interaction content from a social media stream associated with the user account upon successful authentication of the user, the analysis determining context of the social interaction content, wherein the social interaction content includes content provided by the user and/or content provided by social contacts of the user; identifying a field within the user's profile related to the context of the social interaction content; determining if the identified field needs to be filled or updated; when the field within the user's profile related to the context needs to be filled or updated, generating a user interface with a suggestion/query related to the field, the suggestion/query including information obtained from the context of the social interaction content based on the analysis and a suggested user action to be performed for the suggestion/query, the generated user interface presented to the user for user action; and updating the field within the user's profile with information obtained from the user interface, based on the user action, the updating contributing toward completion of the user's profile.

In one embodiment, the method further includes identifying and presenting informational panel associated with the field based on information obtained from the context.

In one embodiment, the social interactions are obtained from within one or more properties hosted within an entity.

In one embodiment, the social interactions are obtained from one or more properties hosted on different entities using an API. The API is used to collect information that is made public by the user or that is identified for sharing by the user.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

Figure 1:
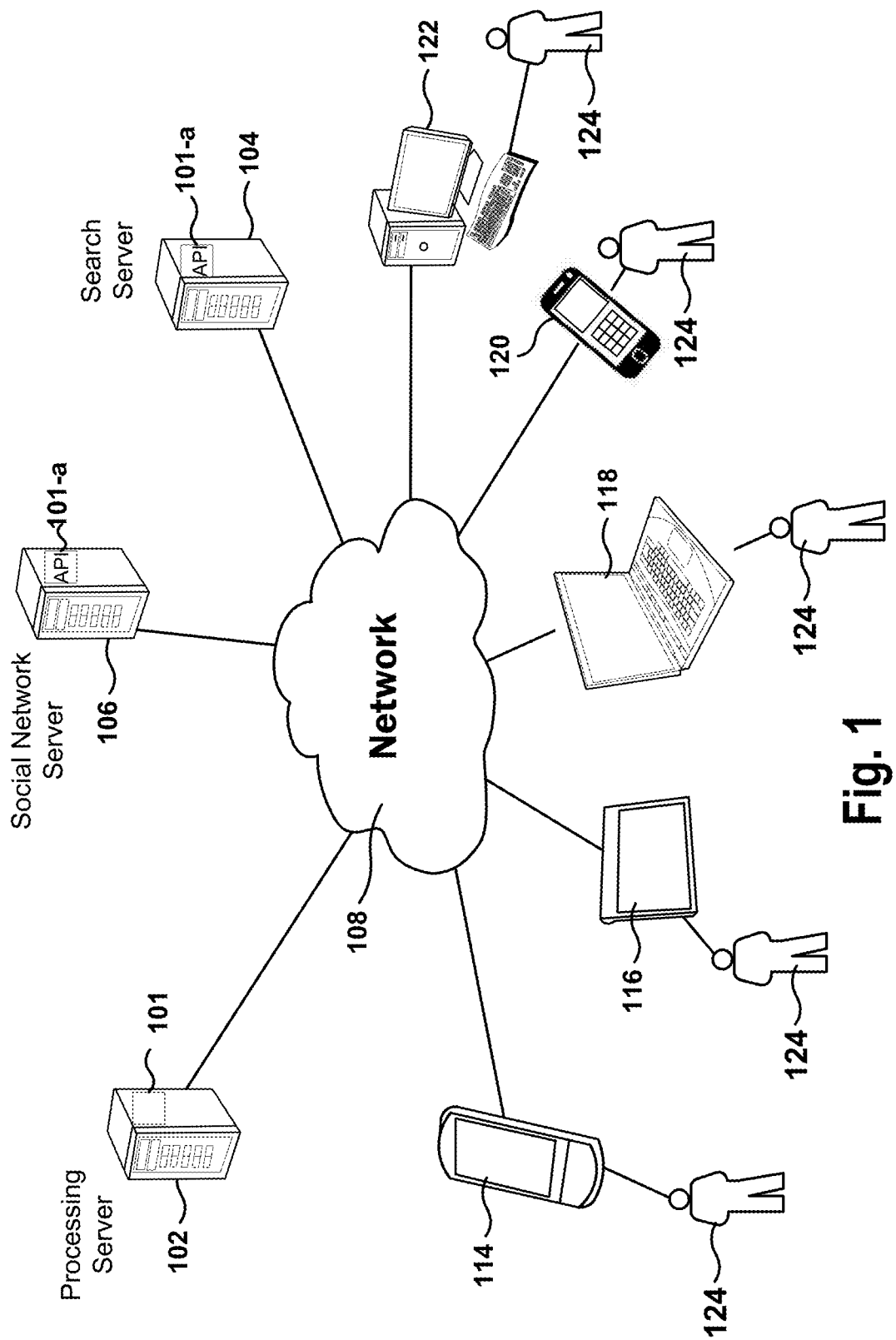
FIG. 1 illustrates an example architecture of a system for implementing embodiments of the disclosure, in accordance with embodiments of the present disclosure.

The following embodiments describe methods, computer programs, and systems for providing a universal profile completion module to solicit information for completing a user's profile. The profile completion module includes logic to analyze data associated with the user or with other users that are socially connected to the user, determine information that needs to be updated in the user's profile. Based on the information gathered, additional data to complete the user's profile or data that may augment the user's profile may be suggested/solicited. The suggested/solicited data may be presented in a recommendation/solicitation module so as to query and/or recommend to the user and to confirm certain data within the user profile. Information obtained based on user action at the recommendation/solicitation module is used to populate and or update certain fields within the user's profile. The universal profile completion module provides for a low-friction query/solicitation tool that can be used to periodically harvest context data from user interactions and use the harvested data to populate the user's profile so that better services and information can be provided to the user. In one embodiment, user approval of the information collected in response to the suggestion/query from within the user interface is obtained prior to updating the user's profile with the information. In this embodiment, the user interface includes an option to receive user's approval before updating the information in the user's profile.

The profile completion module includes a built-in self-trigger mechanism that can trigger in response to user interaction on a webpage. The webpage can be a property page, an application provided user interface page, a webpage, a social network page, etc. The above list of internet content is exemplary and should not be considered restrictive. Other webpages, sites, device interfaces, or applications that allow a user to access, generate and/or exchange data or allow the user to interact with other users/entities may also be considered. As such, the webpage may alternately be a "device interface" that can be accessed by any type of computing devices. In one embodiment, the computing devices may include mobile computing devices, smart phones, smart watches, GPS devices, glasses or other head-mounted devices equipped with processor, any other wearable computing devices, health monitors, computing devices in automobiles or any transportation vehicles, smoke alarms, burglar alarms, etc. The aforementioned computing devices are exemplary and should not be considered restrictive. As a result, the computing devices of the various embodiments described herein may encompass any computing device that can be used to harvest property data as well as display user related data.

In one embodiment, when the profile completion module is on a social network page, the built-in trigger mechanism can trigger when a user receives or posts comments/pictures/posts, etc., from or to other users. Alternately, the built-in trigger mechanism may be set to trigger periodically. The information within the comments/pictures/posts that are made public or that have been elected to be shared by users, may be analyzed to determine if data related to specific fields within the user's profile can be gleaned from the information. When the information related to specific fields of the user's profile that needs updating is gleaned, the module may generate a suggestion comment on a user interface and return the user interface for user confirmation. In addition to updating specific fields in the user's profile, the various embodiments may be used to verify information that is already present in the user's profile. In one embodiment, the user interface returned may also include informational panel related to the user profile field that is to be updated/verified.

In some embodiments, the self-trigger mechanism may trigger on any webpage within a information service provider's website whenever information related to a required information within a user's profile is detected. Due to multitude of properties (i.e., applications, services or webpages) hosted by a information service provider, it is possible that the user may access any one of these properties at any time to exchange, receive, generate or access information. The profile completion module is configured to harvest data accessed, exchanged, received and/or generated by or for the user from within any of the properties hosted by the information service provider, analyze the content in the harvested data to identify contextual information related to a certain field in the user's profile that needs to be filled or verified within the user's profile. It should be noted that the data that is harvested are those that have been made public or have been identified for sharing by the users. Based on the analysis the profile completion module may generate a suggestion comment and/or a query requesting user confirmation/input. Upon confirmation or in response to the query, the profile completion module may automatically update the relevant field in the user's profile directly without requiring the user to access the profile and enter data into the profile.

With a general overview of the profile completion module, specific embodiments will now be described with reference to the following figures. FIG. 1 provides one example architecture of a system that may utilize embodiments described herein. Users 124 interact with different property servers of a information service provider to access data or to generate data. Users 124 may also interact with each other in the context of a social network, where users can include real people and entities. Each user has an account to access the information within the property, such as the social stream within the social network, and the account includes at least a user name. The account can be accessed through user authentication interface that is configured to receive user authentication information, verify the authentication information and provide access to requested information on a property page associated with the user account or provide tools/interface to generate information on the property page. In one embodiment, the property page may be a profile page of a social network. The profile page serves as a landing page for a user to access the information or tools within the social network upon the user's successful authentication. In addition to information or tools, the property page (i.e., profile page of the social network) may include a profile of the user with additional information about the user, e.g., birth date, residence, favorite activities, information related to work, college/school attended, etc. The user is in control of what information is added to the profile, and what information is shared with others. A user may access the property page through different devices, e.g., a smart phone 114, a tablet computer 116, a laptop 118, a mobile phone 120, a personal computer 122, or any computing device that provides access to the Internet. Of course, the illustrated devices are only examples.

In accordance with some embodiments, one or more servers within an entity are used to access one or more services/properties hosted by the entity. For example, a social network server 106 may be used to deliver social media services that enable users to interface and exchange information with each other. The social network provides a website that enables users to define user accounts, which can be accounts for people and entity accounts. Through these accounts, users are able to connect with their friends, group of friends, entities, groups of entities, etc. In some embodiments, the relationships established in the social network may be utilized in other contexts. A processing server 102 can be configured to provide additional services/applications for processing data related to external sites which have integrated social functionality, additional functions related to the social network, e.g., executing applications which run within the social networking environment, etc. A search server 104 provides Internet search capabilities. Additional servers may be configured to provide additional properties or may be configured to assist the aforementioned servers in providing efficient services.

In one embodiment, one of the applications executing on the processing server 102 is a profile completion module 101 that includes logic to analyze data generated by and/or for the user through user interactions at the one or more servers and the information provided in the user profile by the user on a property page to identify content that relates to profile information that are not filled or may need updating/verification in the user's profile. The user interactions may include social interactions and/or service-specific interactions. As a result, the data analyzed by the profile completion module includes data entered by the user, or provided to the user from friends or social contacts of the user in one or more properties (i.e., webpages) hosted by the information service provider, data associated with the user or friends/social contacts of the user or information provided by the information service provider in response to a request/query (e.g., search query) from the user, or by third party sites that the user accessed from within the property page. The profile completion module analyzes the content and context of the data to determine if the data relates to information for specific user profile field that needs updating or verifying. For example, if the user is requesting data about a specific place and the user's profile data does not have the hometown of the user filled or if the hometown of the user filled is different from the specific place, the profile completion module may intelligently determine that the requested data may relate to the user's hometown (either existing or new). Alternately, if the user is requesting information related to art, travel or photos of a particular place, and the user's hobby field is not filled within the user's profile, the profile completion module may intelligently determine the hobby to be the specific art, travel or photography, based on the analysis.

It should be noted herein that user approval is obtained for some or all of the data collected from the users before processing the data for completing the user profile. Accordingly, one or more options directed toward obtaining user approval may be provided in a user interface soliciting user approval prior to updating any fields in the respective users' profile. In one embodiment, the user data that is used for profile completion is based on user actions that are visible to public. In this embodiment, user actions and/or data that is private is not considered for profile completion.

The profile completion module may identify a suggestion or generate a recommendation for the particular field of the user profile data, based on the analysis, and present the suggestion in a user interface with option for confirming the suggestion request by the user. The option for confirming may be in the form of a confirmation statement with an user option for selecting "Yes" or "No". In one embodiment, the option for selection may be in the form of a radio button. In one embodiment, the recommendation/suggestion option may be in the form of textual options provided in the form of radio buttons. In other embodiments, the recommendation/suggestion and confirmation statement may be provided in the form of an icon, image, dynamic content card, or a dialog box.

In some embodiments, the response to confirmation statement may be requested via an email, a text message or any other digital communication method that can be employed by the entity hosting the profile communication module. Based on the user's action (e.g., confirmation feedback) at the user interface, the profile completion module may proceed to directly update the profile data of the user or choose to ignore the suggestion. The profile completion module thus provides a tool to directly update the user profile data based on suggestions from the user's interactions at one or more of the properties, without requiring the user to explicitly select and manually enter specific fields of the profile data.

In one embodiment, the profile completion module is configured to mine data from any of the property pages in which the user has interacted and attempt to update the user profile data directly by analyzing the data mined from various properties, presenting a suggestion of the information for user confirmation and updating the user profile data upon user confirmation. The profile completion module may perform the data mining and analysis periodically. In addition to presenting a suggestion, the profile completion module may also identify and present a query at the user interface to obtain additional information to update the specific field of the profile data, complete additional fields of the profile or to augment the profile data. The query may be obtained from a set of pre-defined queries available to the profile completion module. The query may be a follow-up to the suggestion and may be designed to extract additional information from the user for the specific field or for a different field. This "two-prong" approach of suggestion followed by query or vice versa helps in obtaining more precise data from the user for completing fields within the user profile.

In one embodiment, the query and/or suggestion presented by the profile completion module may also include a panel related to context of the suggestion/query. For example, if the suggestion or query is related to a city of residence or hometown, the suggested panel that accompanies the query or suggestion may be a mini-map of the suggested location. Generating and rendering the panel is to elicit interest from the user for the query/suggestion so as to encourage the user to provide the required information. Sample panels that are presented with the query/suggestion will be described with reference to FIG. 6.

In one embodiment, each of the servers 102, 104, 106 may belong to a different entity and the profile completion module 101 may be executing on the server of one entity and may be exposed to other entities (i.e., third party site) through an API 101-a provided at the entity that hosts the profile completion module. In this embodiment, the user may access different property pages hosted by different entities from a webpage of the entity (e.g., an information service provider) hosting the profile completion module, using a single sign-on. This might be the case when the user accesses a webpage hosted by one information service provider and accesses a social network page hosted by a social media provider that is different from the information service provider, using a link provided within the webpage. The user activities at the different entities may be captured by the profile completion module through the exposed API. The profile completion module may solicit information from the user based on the user's interaction data obtained from or exposed by the third party sites and update fields within the user's profile based on the solicited information. In this embodiment, the API is used to provide the user interface to users on third party sites with suggestions and/or query to solicit the information. The user interface may also include query/suggestion related panels to elicit information from the user. The entity hosting the profile completion module may share a limited amount or all of the profile data based on the visibility settings provided by the user for the different fields within the user's profile and based on the share setting defined for the user data, approval from user and approval from the entity.

It should be noted that the profile completion module may be used to not only elicit information from the user for fields that are left un-filled in the profile data but also to confirm/verify data provided within other fields. The profile completion module may, from time to time, perform the verification of the profile data to ensure that the data within the user profile is current. The updated profile data may be shared amongst all the properties within the entity or only selected ones of the fields may be shared with all or some of the properties within the entity. The profile completion module may be considered as a universal editor that allows self-triggering on any of the properties within or outside of the entity that are exposed to the universal editor directly or through API. The universal editor centralizes the collection of information for updating the user profile without requiring user to explicitly access and manually update the user profile.

It is noted that the embodiments illustrated in FIG. 1 are exemplary. Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting, but rather exemplary or illustrative.

Figure 2:
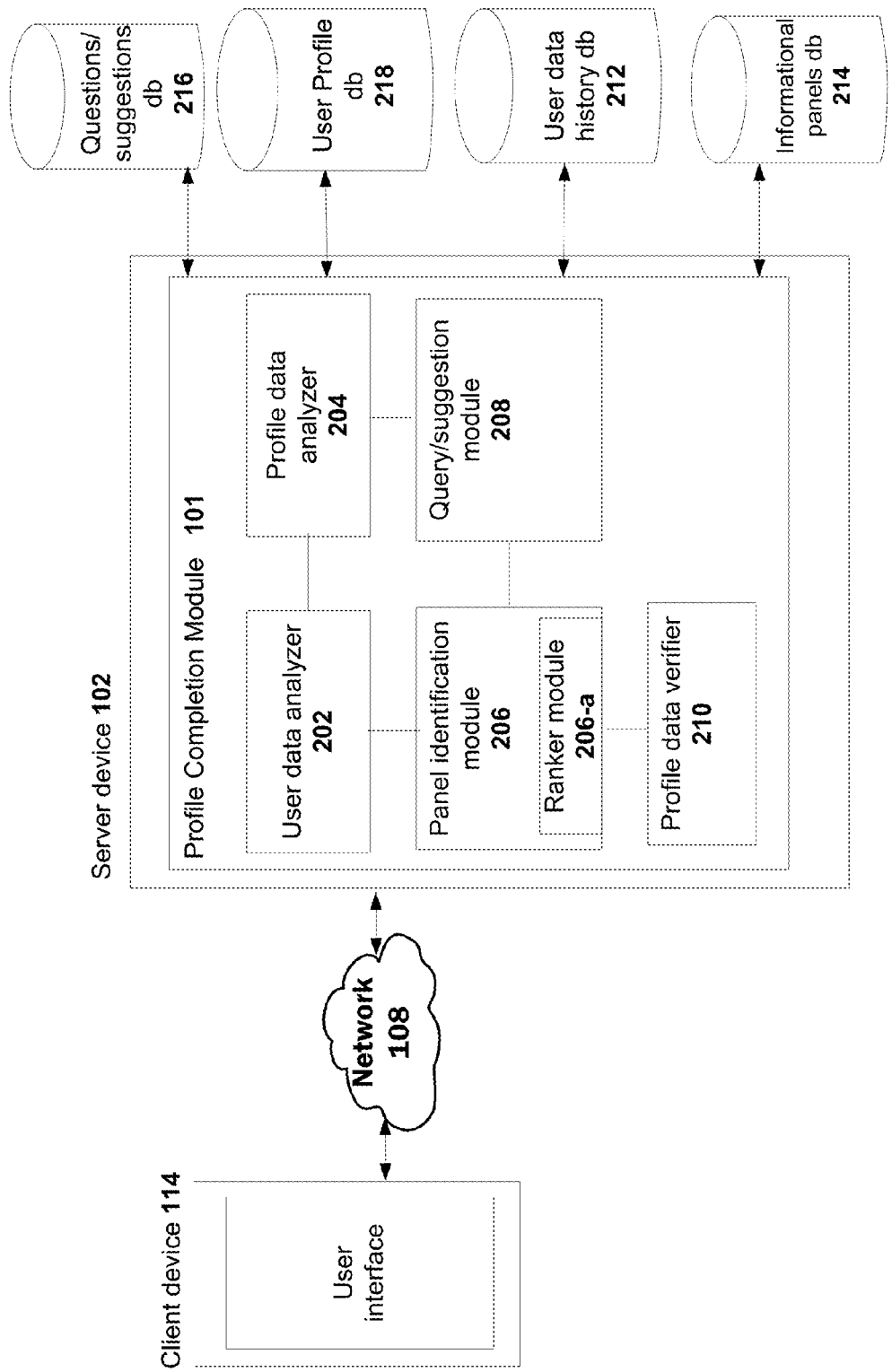
FIG. 2 illustrates various modules within a profile completion module used for completing profile data, in accordance with an embodiment of the invention.

Various contextual examples illustrating implementations of various embodiments of the invention are contemplated. FIG. 2 illustrates an exemplary list of modules within the profile completion module executing on a server 200 providing a property or webpage for a service accessed by the user through the client device 100. The client device 100 is any computing device that can connect to the internet and may include a smart phone, desktop computing device, tablet computing device, laptop computing device, etc. The client device includes a display device configured to capture user interactions and transmit to the server for processing and for rendering the user interface generated by the profile completion module. The various modules within the profile completion module include algorithm having logic to detect, select, analyze and otherwise process the data, including interaction data, and to update the relevant fields within a user's profile based on user actions and interactions. Some of the exemplary modules within the profile completion module includes user data analyzer module 202, profile data analyzer module 204, panel identification module 206, query/suggestion module 208 and a profile data verifier 210. The panel identification module may include a ranker module 206-a to organize the panels used for suggestions/query in the user interface rendered at a display portion of a client device. The above list of modules should not be considered exhaustive. Fewer or additional modules may be included to provide the functionality of the profile completion module.

The user data analyzer module 202 of the profile completion module includes logic that is configured to access user interaction data provided by the various properties within an entity or obtained from different entities through an exposed API to determine the content of the data in the user interaction. The user data analyzer module 202 may interact with user data history database 212 that stores the user interaction of the user over time and determine the content and context of the user interaction over time. This information is useful in determining whether information in any fields within the user's profile provided by the user, needs to be updated or verified.

The profile data analyzer 204 includes logic that is configured to analyze the profile information provided by the user within the user's profile and determine which data fields need to be filled and which data needs to be updated/verified. The profile data analyzer module 204 may interact with a user profile database 218 to obtain the profile information provided by the user.

The query/suggestion module 208 includes logic that is configured to receive the analysis of the user interaction information from the user data analyzer 202 and the analysis of the user profile information from the profile data analyzer module 204 and determine which fields need to be filled/updated/verified and which information from the user interaction can be used in generating the suggestion/query. Once the query/suggestion module 208 determines a specific field for querying or providing suggestion/recommendation, the query/suggestion module 208 may query a panel questions/suggestions datastore 216 to identify which question or suggestion can be presented in a user interface for soliciting information from the user for the specific field. The query/suggestion module 208 may also interact with panel identification module 206 to determine if any panel needs to be included with the suggestion/query retrieved from the panel questions/suggestions datastore 216.

The panel identification module 206 may interact with a panel datastore 214 to identify the one or more panels that need to be included with the suggestion/query. In one embodiment, the panel identification module 206 includes a ranker module that includes a ranking algorithm to organize the panels selected for inclusion with the suggestion/query in the user interface returned to the user for soliciting confirmation/additional information. In one embodiment, the order of the panels that are returned to the user may be based on several factors, such as what profile information the user has filled out, what information the user chose to fill out later and what information the profile completion module solicits to receive based on the user's social graph or social connection, etc. The selection and organization of the panels presented to the user is to engage the interest of the user so as to be able to elicit the requested information/confirmation as efficiently and as quickly as possible.

The query/suggestion module 208 may identify information for the panel queries/suggestions based on a variety of input signals. Some exemplary input signals include location signal based on a physical device of the user, user activity within a property hosted by an entity, social connection to other users, etc. The query/suggestion module 208 may use any one or combination of the input signals to identify the information for the panel queries/suggestion. For example, in order to provide suggestions on residence city when the user has not provided the residence city in the user's profile, the query/suggestion module 208 may use the user activity signal from within the property and/or from social interactions with users of a particular geo location to offer suggestions of different cities. Thus, when the user is in a social network site and is interacting with users from Cupertino or Palo Alto (cities in California, U.S.A.), and the location signal identifies the location of the physical device with which the user is accessing the property page is Sunnyvale (another city in California, U.S.A.), the query/suggestion module may use the user activity signal and the location based signal to determine the information for a query, "Do you live in Cupertino, Palo Alto, or Sunnyvale?" or a suggestion, "We notice that you are interacting with users from Cupertino, Palo Alto and Sunnyvale, perhaps you reside in one of these places." with a suggestion statement of "Yes/No" provided in the user interface.

In one embodiment, the query/suggestion module may rank the information obtained through the various input signals for a particular field of the user profile data that is sought to be filled to determine the information for the query/suggestion retrieved from the panel questions/suggestion data store 216. For example, the query/suggestion module 208 may use employer, education, or location information from user's social connections and find the most popular employer(s), school(s) and city/cities within the user's social network. The query/suggestion module 208 may use this ranking to present information options for the query/suggestion to suggest if they work for the same employer suggested in the top ranked employers amongst their social connections, or attend the same school or live in the same city as their social connections. This form of ranking and analyzing the social interactions is to present as much information as possible to the user and to elicit a response using a simple yes/no option. The input signals can be augmented using the user's location or frequently visited places or other information that can be obtained through historical user data analysis.

The employer, education or location or exemplary field values that may be used for eliciting information from the user to fill certain fields in the user's profile. Other options may include group social contacts into distinct groups and using the users interactions with each of the distinct groups to determine place of work, school attended, etc. Some of the exemplary fields that may be used within the profile data include birthday, profile picture, place of residence, hometown, school attended, place of employment, relationship status, contact information, to name a few. The various user interfaces that are provided to elicit information for the aforementioned fields of profile data are discussed with reference to FIGS. 4 through 15.

User action/interaction at the user interface rendering the queries/suggestion, is monitored. In response to the user interaction at the user interface, the profile data verifier module 210 receives and verifies the information provided through the user interaction at the user interface to determine if the information is valid. If the information is valid, the profile data verifier module will proceed to update the necessary field within the user profile. If the information is not valid or upon successful verification and updating of the information obtained through the user interaction, the profile data verifier module 210 may further interact with the query/suggestion module 208 to identify a follow-up suggestion or query and use the information based on the user response to the follow-up suggestion or query to further augment the profile data and/or update the profile data.

In one embodiment, the user may be provided with incentives to provide information related to the user profile. Accordingly, the profile completion module may be configured to award such incentives as and when the requested information is provided by the user. The incentives may be monetary (either real or virtual) or non-monetary and may include, discount offers for retail transactions, information related to one or more promotional events, information related to an event corresponding to one or more user profile data, for example, events in or near a geo location of the user, etc., products discount information, monetary offer, or any combinations thereof. The incentives could include other forms of incentives, for example, offers of free game play in a game, virtual offers, etc. In one embodiment, the profile completion module may use the input signals that was used to provide information to the query/suggestion to also verify the accuracy of the data provided by the user in response to the query/suggestion. The accuracy of information may be verified using one or more of physical device's location, monitoring user activity within a product, monitoring user connections to other users, etc. Upon successful verification of the accuracy of the data obtained through query/suggestion, the profile data may be updated directly by the profile completion module. The updated profile data depicts a more complete user profile information.

As mentioned earlier, the profile completion module may not only be used to elicit response from a user to provide information to one or more fields that are empty but also may be used from time to time to verify the accuracy of the information in fields that were provided by the user so as to keep the profile information more current. The some or all the profile data information of the user can be shared among some or all of the properties within an entity and may also be shared with other entities based on expressed consent obtained from the users and entities involved.

Figure 3:
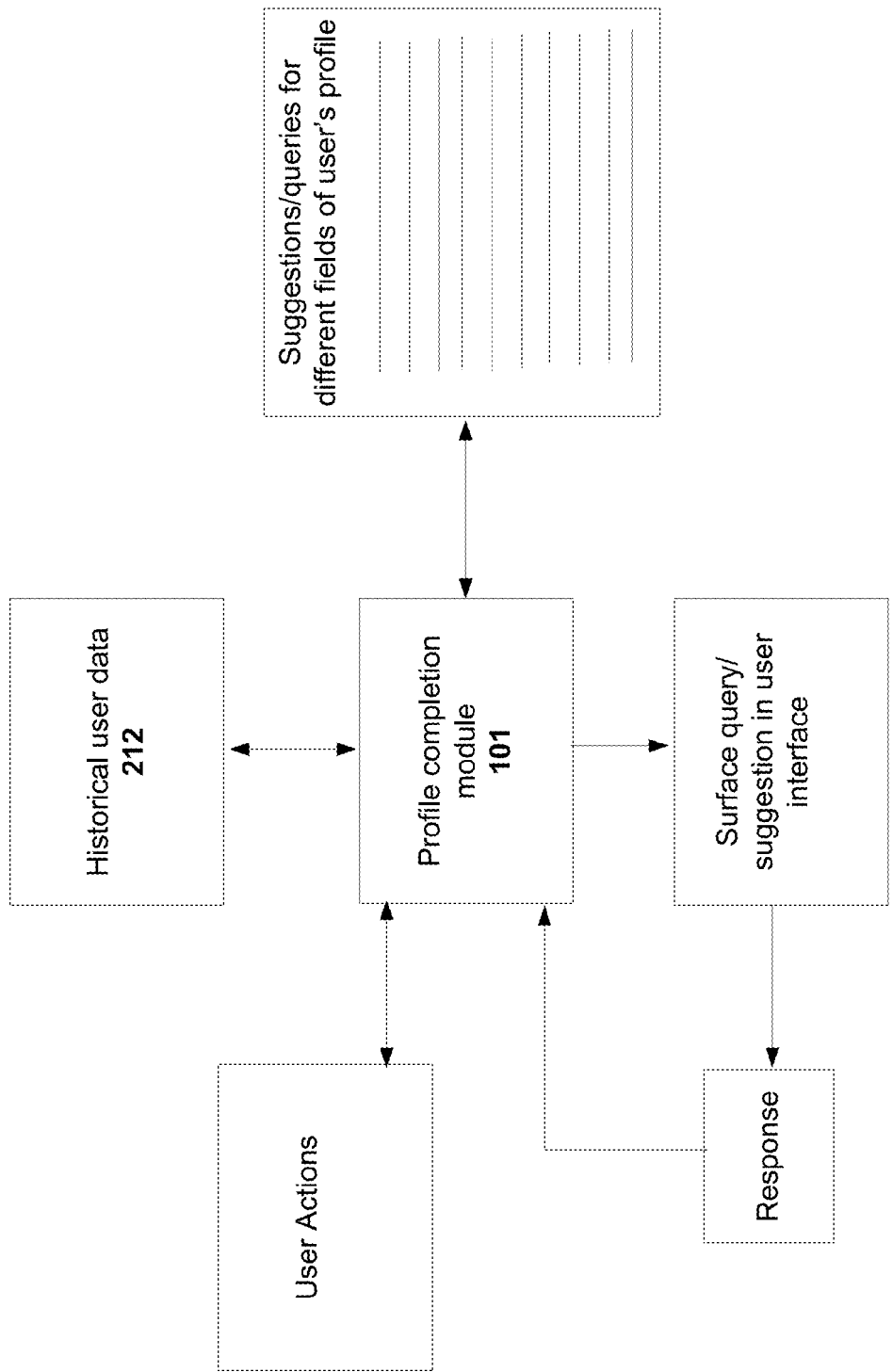
FIG. 3 illustrates a method flow for completing profile data, in accordance with an embodiment of the invention.

FIG. 3 illustrates information flow between the various modules within a server executing a logic contained within a profile completion module, in one embodiment of the invention. The profile completion module (i.e., the universal editor) analyzes the historical user data maintained in a user data history repository to determine the context of various user interactions. The profile completion module may examine the various fields of the user profile data provided by the user to determine which fields have valid data and which fields need information to complete the user profile. Once the profile completion module determines which fields need information to complete and which fields need information to update, the profile completion module will identify and analyze the interactions within the historical user data to identify data related to the field for which user solicitation is sought. The profile completion module also monitors and analyzes user actions in the property page. User actions in the property page may be used as an input to validate the response obtained from the user. The profile completion module will then identify which panel question to select for generating a query/suggestion for soliciting information from the user. For example, if city of residence field needs to be filled, the profile completion module may select, "Which city do you live in?" query or "I notice that you interact with people from x, y, and z locations. Perhaps you live in x, y, or z location. Yes/No" suggestion to select for presenting in a user interface with query/suggestion statement and/or panel to elicit user interaction and participation. The suggestion/query surfaces on a user interface presented at the user's client device. Response to the query/suggestion provided is forwarded to the profile completion module for verification. The verification may include validating the information against the information provided by input signals, such as user actions, and identifying a follow-up query/suggestion for presenting on the user interface. Upon successfully validating the information, the profile information module may update the user profile data. The process of generating queries/suggestions, receiving the response, validating the response, and updating the information in the desired field are performed periodically till the user profile information is complete. Alternately, the process of generating queries/suggestions, receiving the response, validating the response and updating the information may be automatically performed in response to user actions/interactions detected at the one or more property page(s).

Figure 4:
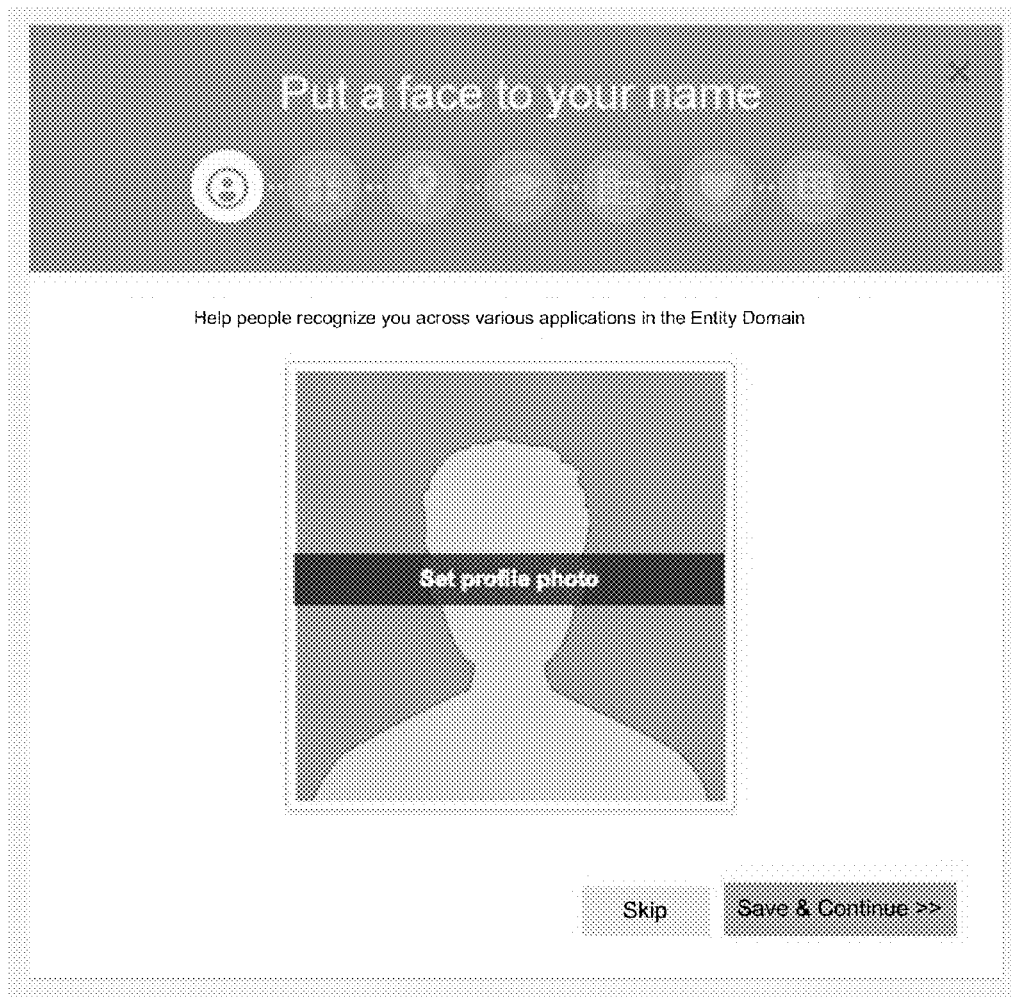
FIG. 4 illustrates an exemplary mock screen of a user interface requesting profile picture of a user for updating to the profile data, in accordance with an embodiment of the invention.

With the detailed understanding of the functions of the profile completion module, a sampling of the user interface presented by the profile completion module for soliciting information for the various fields in the user profile will now be described with reference to FIGS. 4-15. FIG. 4 illustrates an exemplary mock screen of a user interface that requests information related to profile photo of a user. The user interface includes a list of different fields for which user solicitation may be sought at the header portion of the user interface with the profile photo field option highlighted indicating that the current request presented in the user interface is seeking user's response to the profile photo field. The user may respond with a profile photo or may choose to ignore the request. Based on user interaction at the profile photo filed may be updated in the user profile data.

Figure 5:
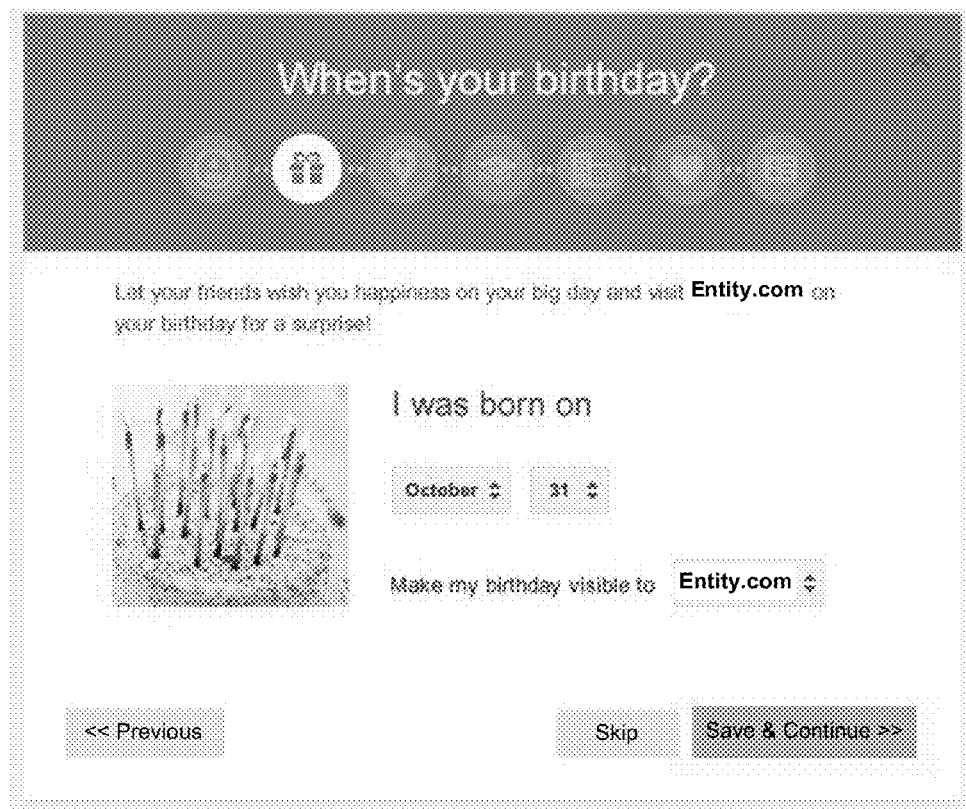
FIG. 5 illustrates an exemplary mock screen of a user interface requesting information related to a birthday field in the profile data, in accordance with an embodiment of the invention.

FIG. 5 illustrates an exemplary mock screen of a user interface that requests information related to user's birthday field of the user's profile. The appropriate field (e.g., birthday field) is highlighted at the header portion of the user interface to indicate that the current request presented in the user interface is seeking user's response to the birthday field. The user interface includes an image appropriate for the selected field as well as a field that is formatted to suggest a calendar day based on analysis of data associated with the user and friends of the user. User interaction at the birthday field will be used to update the relevant field in the user profile data.

Figure 6:
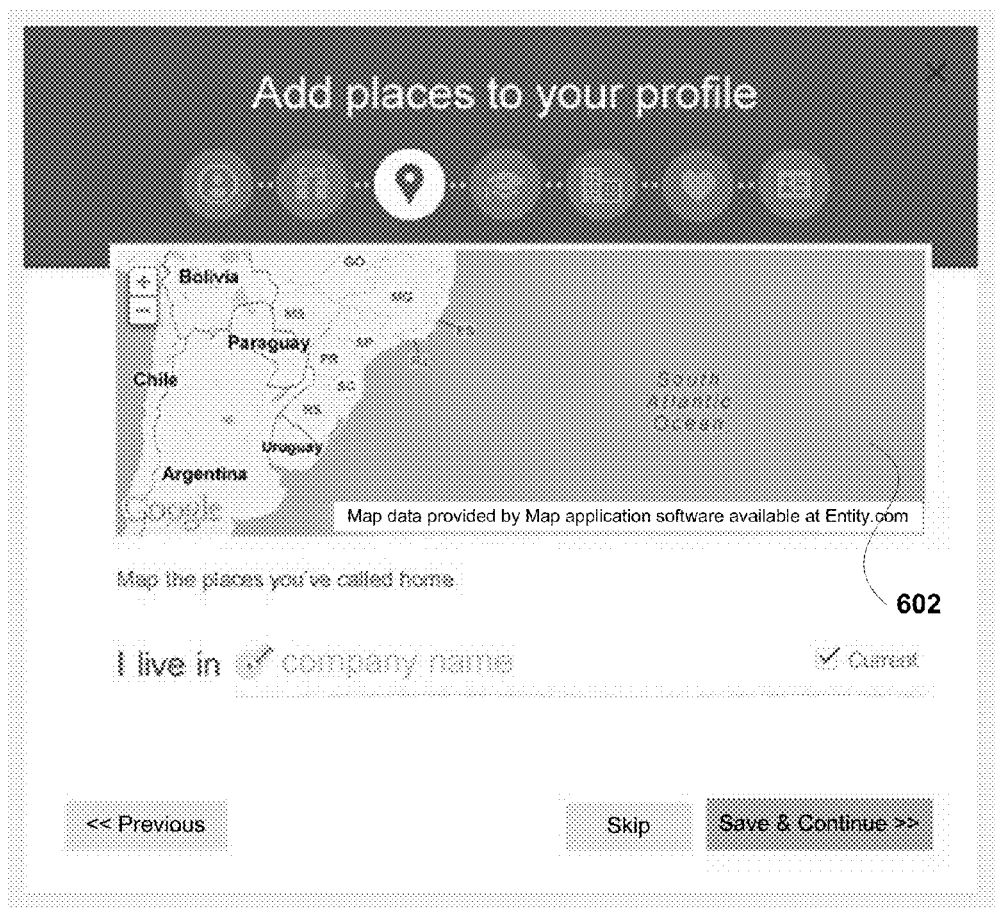
FIG. 6 illustrates an exemplary mock screen of a user interface requesting information related to city of residence field in the profile data, in accordance with an embodiment of the invention.

FIG. 6 illustrates an exemplary mock screen of a user interface that requests information related to user's place of residence field of the user's profile. The user interface returned for rendering at a client device may include a mini-map panel 602 of the location that is identified based on the analysis of user interactions and data associated with the user and friends of the user. Appropriate confirmation statement is also rendered. User interaction at the city of residence field or at the mini-map may be used to update the relevant field in the user profile data.

Figure 7:
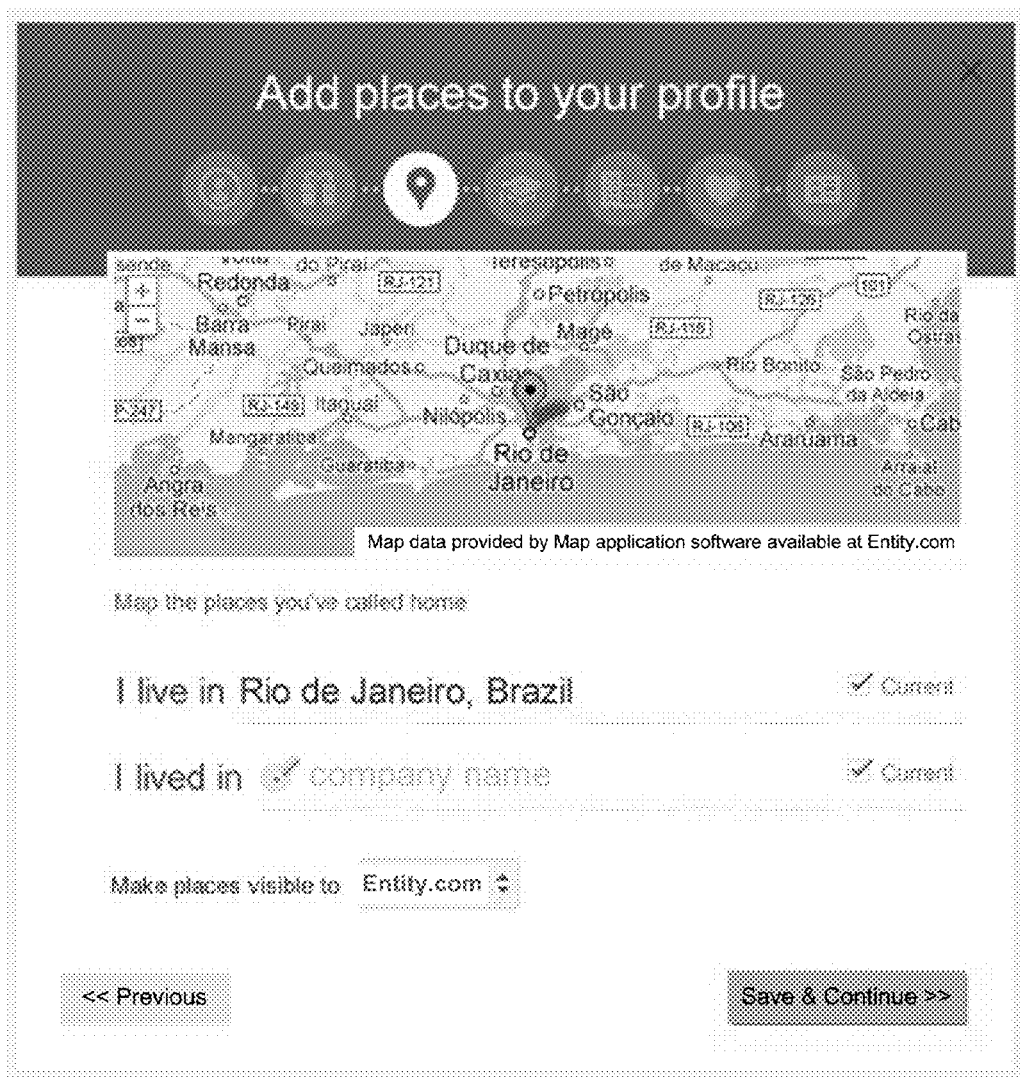
FIG. 7 illustrates an exemplary mock screen of a user interface requesting additional information related to city of residence field in the profile data, in accordance with an embodiment of the invention.

FIG. 7 illustrates an exemplary mock screen of a user interface that requests additional information related to user's place of residence field of the user's profile. The additional information sought may be to identify cities that the user previously stayed or visited. The mini-map panel is updated to reflect the user's response. User response at the query/suggestion field will be used to update the relevant field in the user profile data or to augment the user profile data.

Figure 8:
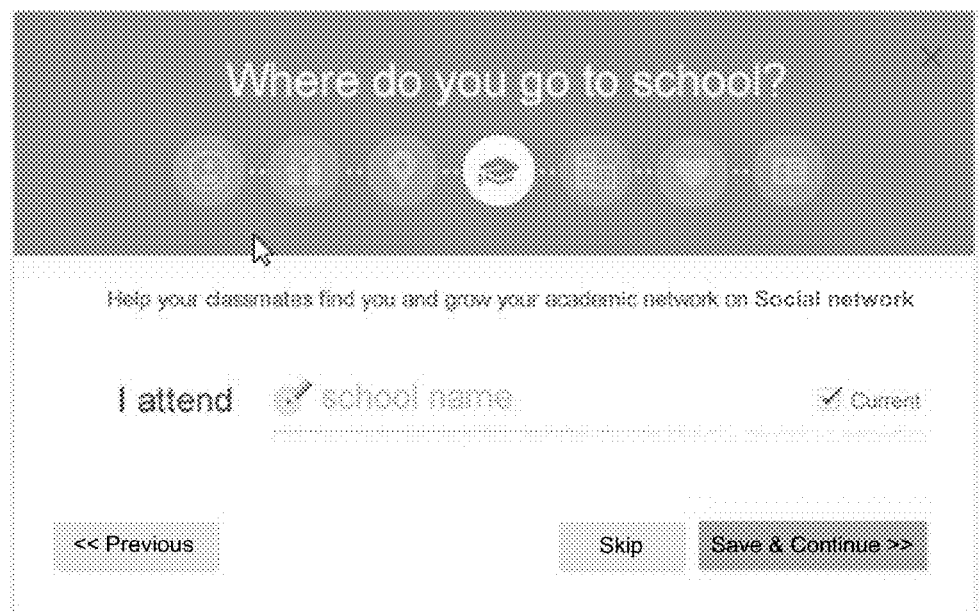
FIG. 8 illustrates an exemplary mock screen of a user interface requesting information related to school attended field in the profile data, in accordance with an embodiment of the invention.

FIG. 8 illustrates an exemplary mock screen of a user interface that requests information related to school(s) attended. This information may be used to suggest to the user which groups to join. The profile completion module may provide different school suggestions based on analysis of information associated with the user and friends of the user and identifying the top choices of schools based on the analysis and request user confirmation. The school attended field is updated based on user confirmation of the suggested school choices at the user interface.

Figure 9:
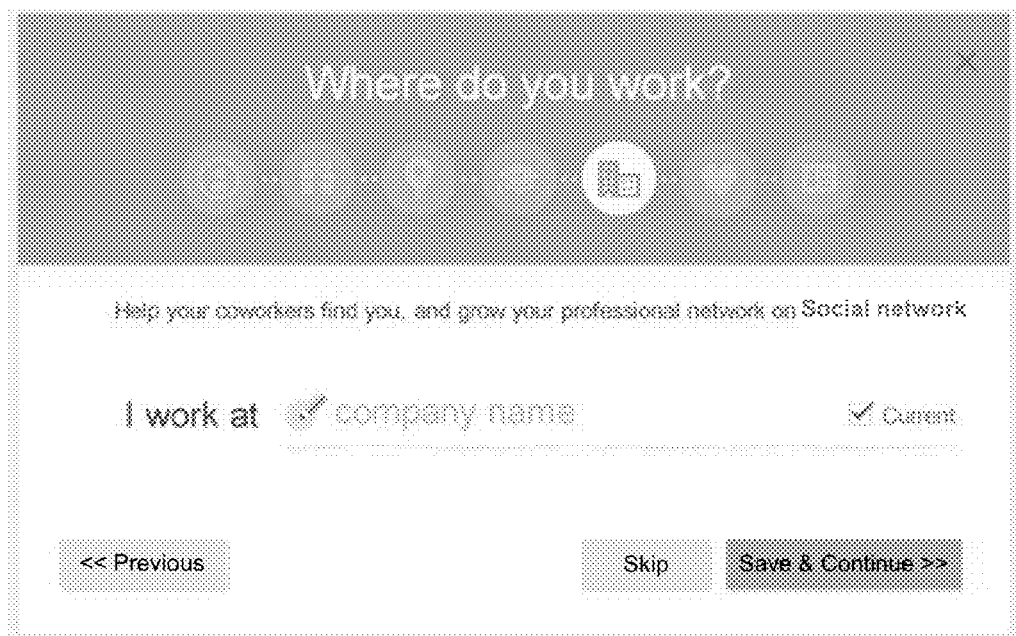
FIG. 9 illustrates an exemplary mock screen of a user interface requesting information related to a employment field in the profile data, in accordance with an embodiment of the invention.

FIG. 9 illustrates an exemplary mock screen of a user interface that requests information related to place of employment field of the user profile. This information may be used to establish social network and for suggesting job postings, conference or job related events, etc. Place of employment field may be updated based on user interaction at the confirmation statement field or at the place of employment field within the user interface.

Figure 10:
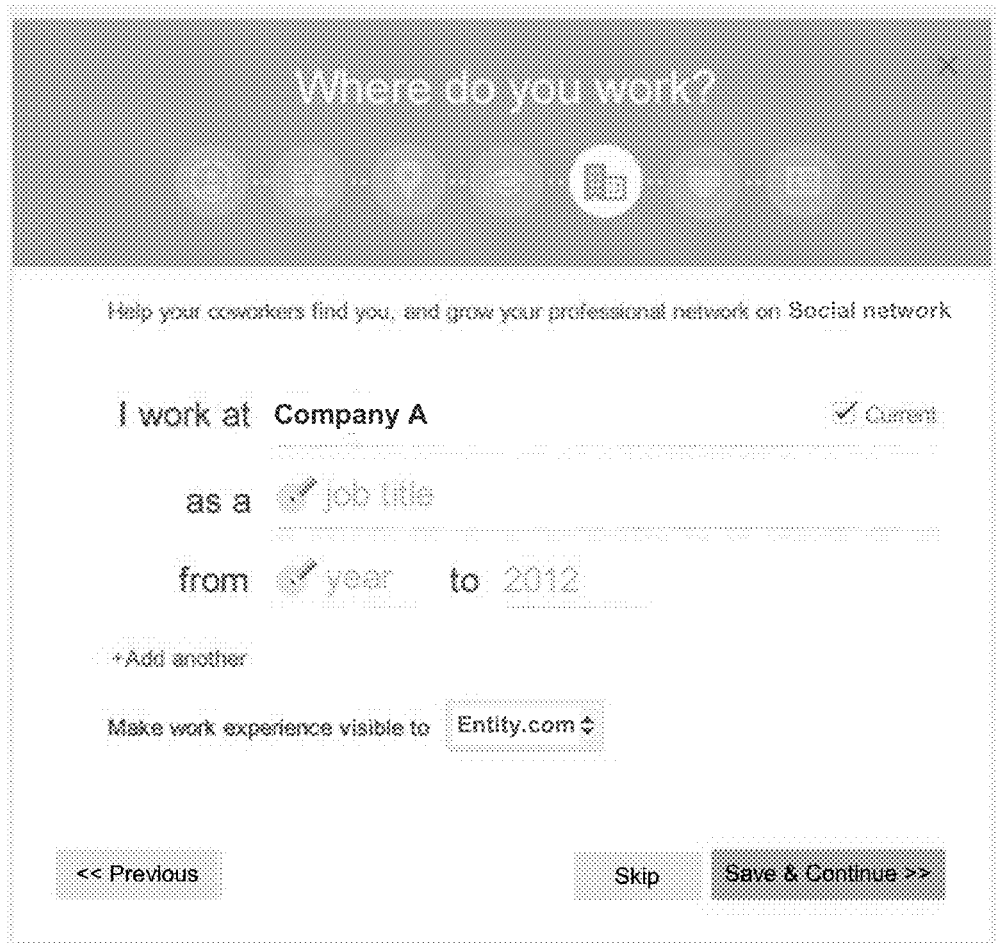
FIG. 10 illustrates an exemplary mock screen of a user interface requesting additional information related to the employment field in the profile data, in accordance with an embodiment of the invention.

FIG. 10 illustrates an exemplary mock screen of a user interface that requests additional information related to place of employment field of the user profile. As illustrated, in addition to requesting information with reference to place of employment, a follow-up query/suggestion may request period of employment at the place of employment. Such information is used to augment the user's profile data. Based on the user's response to the follow-up query/suggestion, appropriate field is updated or populated from the information provided in the user's interaction.

Figure 11:
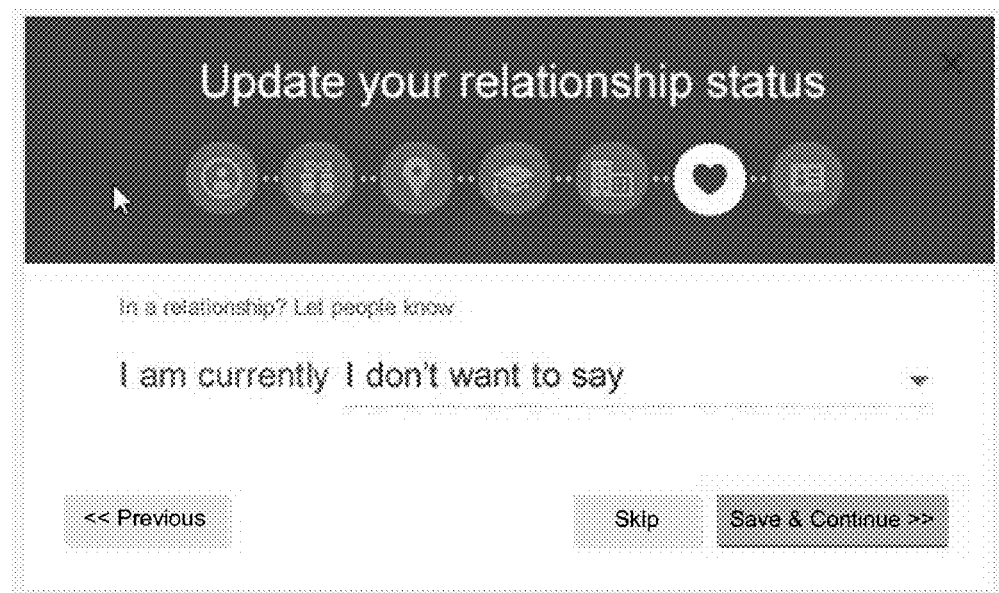
FIG. 11 illustrates an exemplary mock screen of a user interface requesting information related to a relationship status field in the profile data, in accordance with an embodiment of the invention.

FIG. 11 illustrates an exemplary mock screen of a user interface that requests information related to relationship status of the user profile. The status field may be used to suggest dating sites, events or promotional offers. User response at the user interface is used to update the relationship status field of the user profile.

Figure 12:
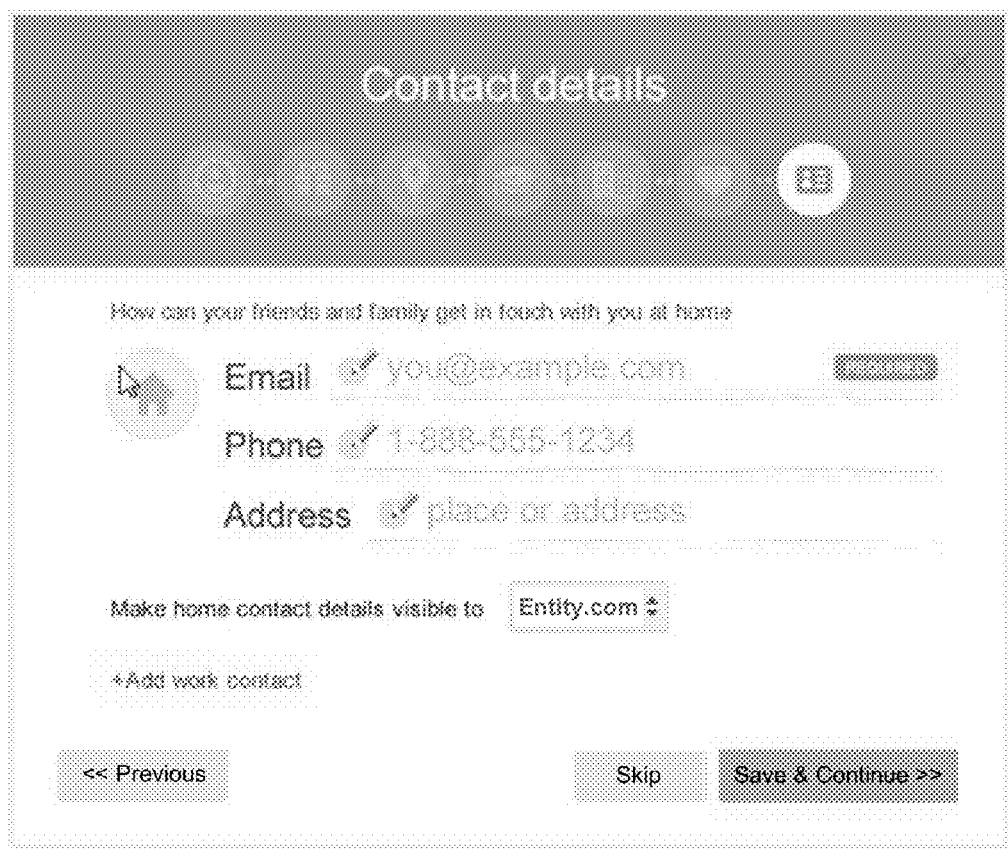
FIG. 12 illustrates an exemplary mock screen of a user interface requesting information related to contact information field in the profile data, in accordance with an embodiment of the invention.

FIG. 12 illustrates an exemplary mock screen of a user interface that requests contact information of the user for updating the user profile. The contact information may include email address, home phone number, home address, etc. The information from the contact information may be used to events, promotions, groups to interact with, etc. In addition, each of the exemplary mock screens depicted in FIGS. 4-12 include an option to either make the relevant fields visible to other users, keep it private or to make it visible to only a select list of social contacts. Based on the share settings associated with each field, the information in the various fields of the user profile may be shared with other users and entities.

Figure 13:
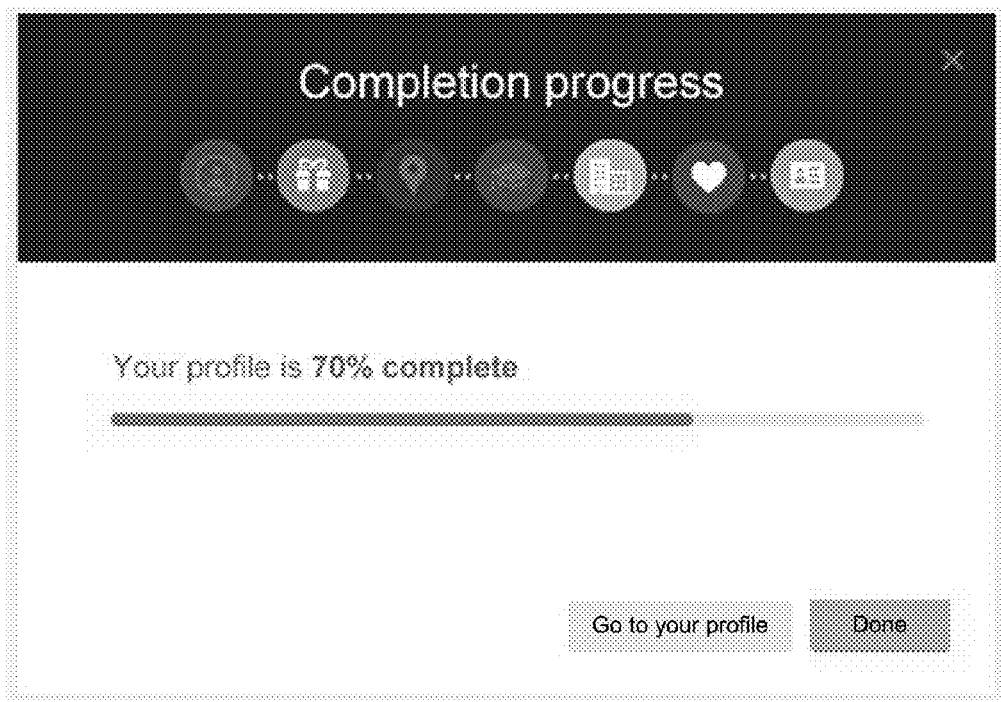
FIG. 13 illustrates an exemplary mock screen of a user interface rendering status of profile data completed by a user, in accordance with an embodiment of the invention.

FIG. 13 illustrates an exemplary mock screen of a user interface that identifies the amount of profile data information that is complete. This information may be used by the profile completion module to determine how frequently the user data needs to be harvested and analyzed to solicit information from the user.

Figure 14:
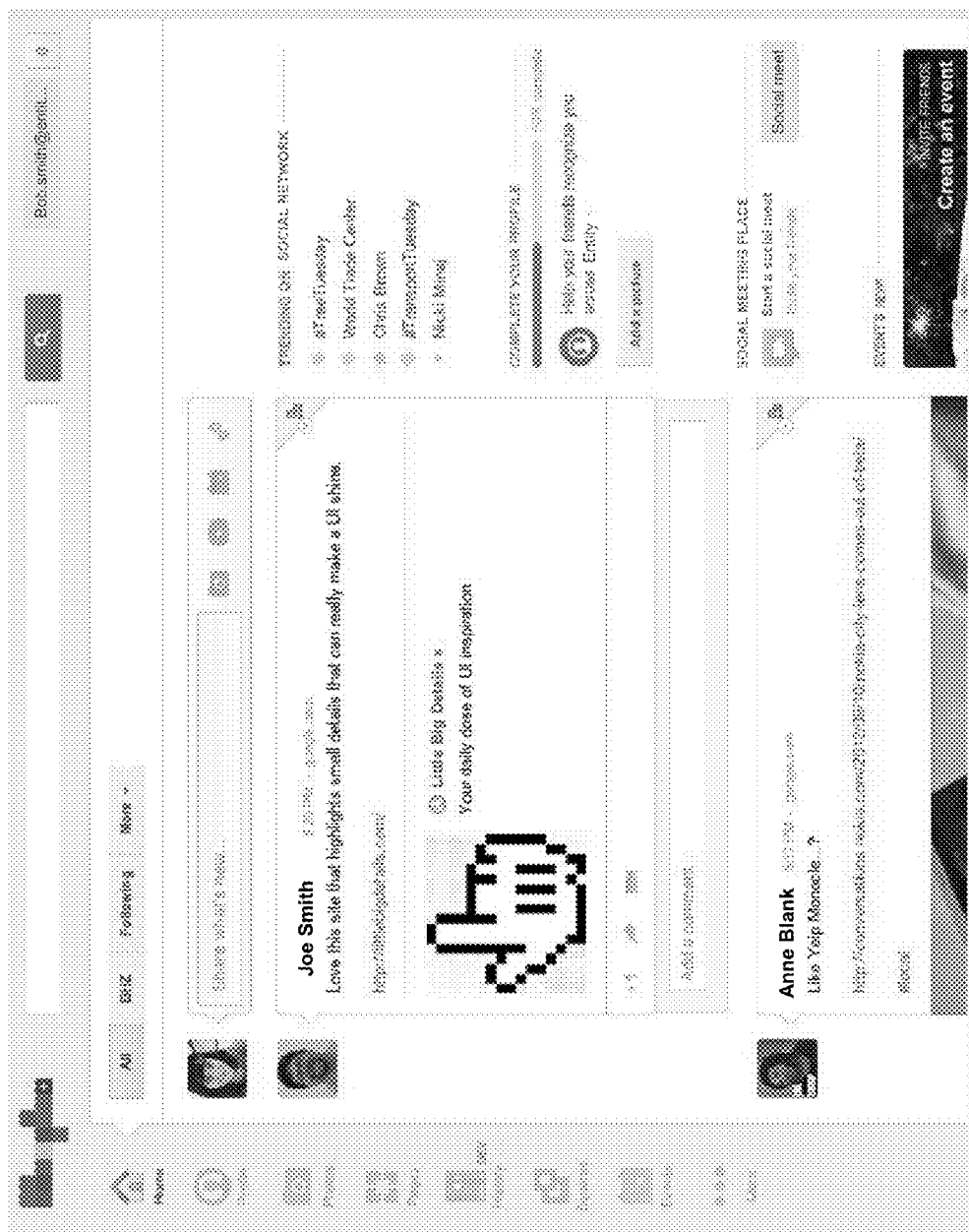
FIG. 14 illustrates an exemplary mock screen of a user interface within a social network from which profile data information may be obtained, in accordance with an embodiment of the invention.

FIG. 14 illustrates an exemplary mock screen of a user interface within a property page, such as social network property page, from which user profile information may be sought and received. The profile completion module includes self-triggering mechanism that may automatically trigger upon detection of user interactions. In one embodiment, the profile completion module is triggered when the user interaction data includes information related to a specific field of the user profile for which information is being sought. The profile completion module may be used to extract information from any of the property pages within an entity and from a third party site through an exposed API. The user interface to access the profile completion module may include a profile data status to provide a visible indicator on how much data within the user's profile data has been updated. Of course, the property page illustrated in FIG. 14 is illustrative and the profile completion module can be accessed from any property page within the entity or outside of the entity using an exposed API.

Figure 15:
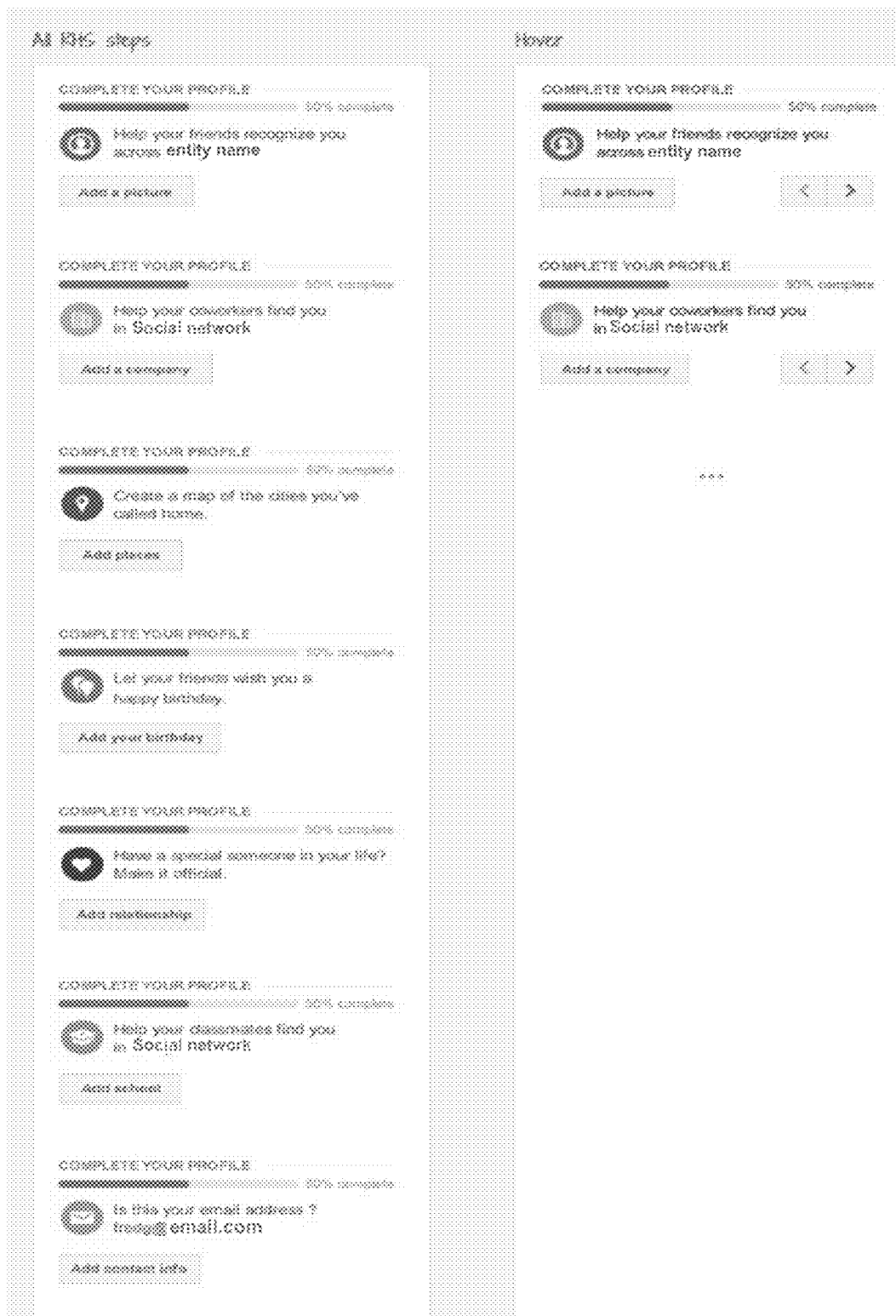
FIG. 15 illustrates an exemplary mock screen of a user interface identifying status of various fields within a user profile that have been updated using information obtained from various signals/sources, in accordance with an embodiment of the invention.

FIG. 15 illustrates a summary of the various fields of the user profile and status of each of the fields in the user profile. This information may be used by the profile completion module to continue harvesting the user data information and update data related to specific fields of the user profile.

Figure 16:
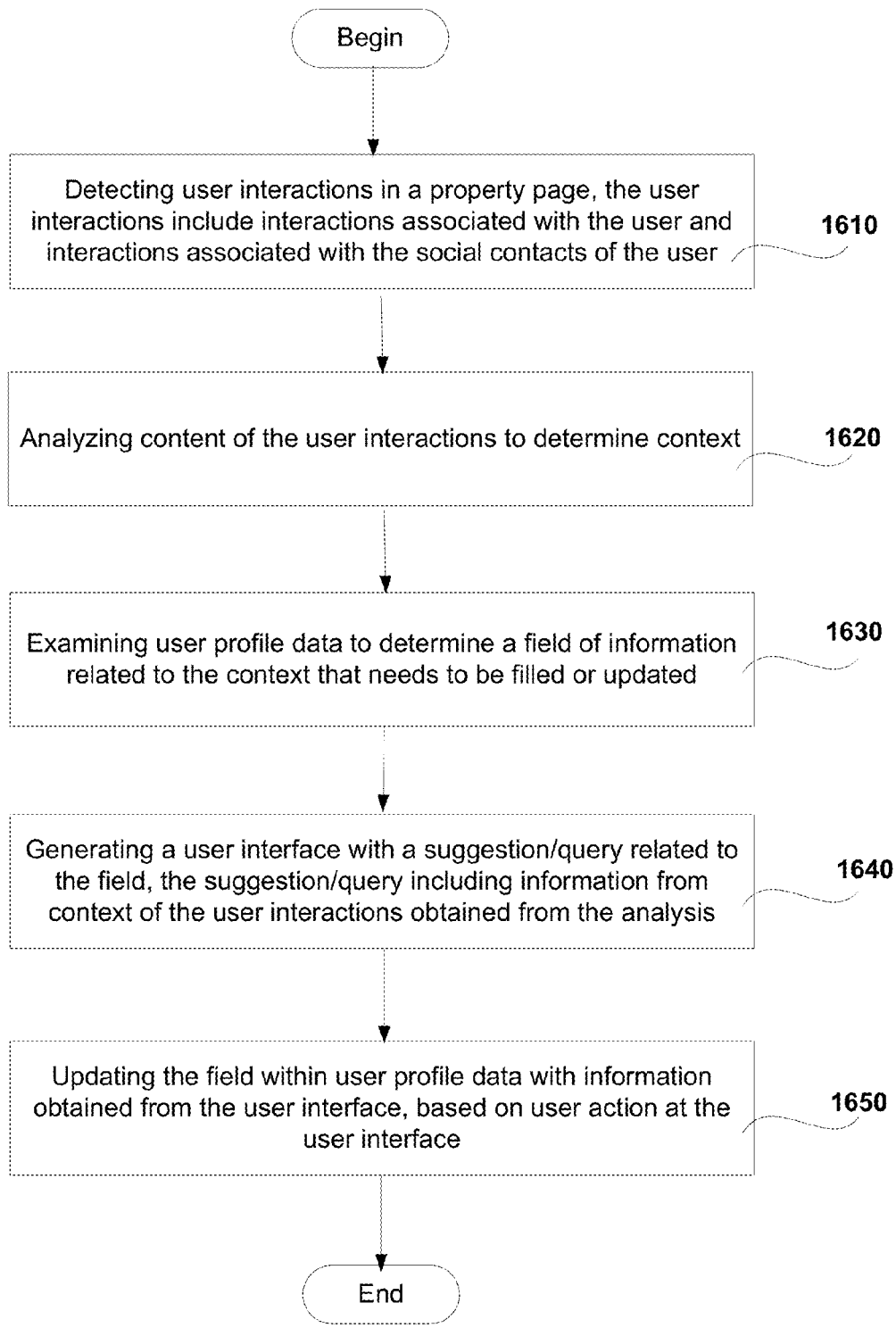
FIG. 16 illustrates method operations for completing user profile data, in accordance with an embodiment of the invention.

With the above general understanding of the function of the profile completion module, a method for completing user profile will now be described with reference to FIG. 16. The method begins in operation 1610, when user interactions at a property page are detected. The user interactions may include social interactions, such as comments, posts, pictures, etc., generated by a user or by the social contacts of the user or entities or groups of entities that are socially connected to the user or general actions/interactions associated with the user or actions/interactions associated with social contacts of the user. The user interactions are analyzed to determine the context of the interaction and/or data content associated with the user or social contacts of the user, as illustrated in operation 1620. User profile information is examined to determine a field related to the context that needs to be filled or updated, as illustrated in operation 1630. Based on the examination of the user profile information and the analysis of the user interactions, a user interface with a query/suggestion related to the field is generated, as illustrated in operation 1640. The query/suggestion includes information from context of the user interactions obtained from the analysis. The user interface may also include a confirmation statement to confirm the suggestion or a suggested user action to be taken at the user interface, an input area for responding to the query and/or the suggestion, if needed. The query/suggestion may be identified from a pre-defined list of queries/suggestions and is related to a specific field of the user profile that is to be filled. Response to the query/suggestion at the user interface is monitored and used to update the field in the user profile based on user action at the user interface, as illustrated in operation 1650. Follow-up query/suggestion may also be provided to obtain additional information for the field, to augment one or more fields within the profile data or to update additional fields. The process of detecting user activities, analyzing the user activities, providing queries/suggestions, monitoring response and updating fields within the user profile may be performed from time to time till all the fields with in the user profile are completed.

The profile completion module provides a tool that uses subtle suggestions and low friction queries to solicit information from the user and use the information to directly update the user profile information. The user profile information is updated by the logic within the module without requiring the user to explicitly access and manually update the profile data. The profile completion module acts as a universal editor gathering information from within the different properties of information service provider/entity and from outside through an exposed API and centralizing the updating of the user profile. The updated user profile may be shared by the various properties within the entity and may also be used to share some of the profile information based on expressed consent or approval by the user and the entity involved.

Figure 17:
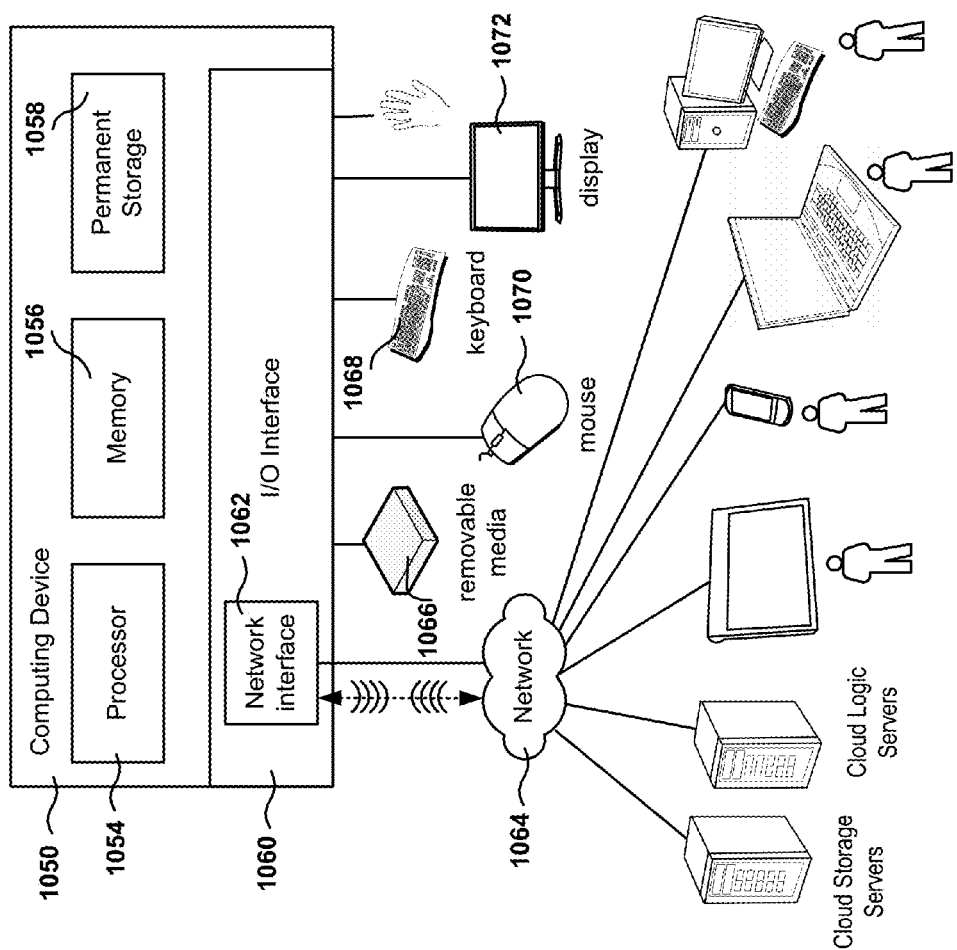
FIG. 17 is a simplified schematic diagram of a computer system for implementing embodiments of the present disclosure.

FIG. 17 is a simplified schematic diagram of a computer system for implementing embodiments of the present disclosure. It should be appreciated that the methods described herein may be performed with a digital processing system, which in one embodiment may be a conventional, general-purpose computer system. Special purpose computers, which are designed or programmed to perform only one function, may be used in the alternative. The computing device 1050 includes a processor 1054, which is coupled through a bus to memory 1056, permanent storage 1058, and Input/Output (I/O) interface 1060. The computing device 1050 can be any computing device that can connect to the internet and provide functionality of the profile completion module. Exemplary computing devices 114, 116, 118, 120 and 122 are illustrated in FIG. 1.

Permanent storage 1058 represents a persistent data storage device, e.g., a hard drive or a USB drive, which may be local or remote. Network interface 1062 provides connections via network 1064, allowing communications (wired or wireless) with other devices. It should be appreciated that processor 954 may be embodied in a general-purpose processor, a special purpose processor, or a specially programmed logic device. Input/Output (I/O) interface 1060 provides communication with different peripherals and is connected with processor 1054, memory 1056, and permanent storage 1058, through the bus. Sample peripherals include display 1072, keyboard 1068, mouse 1070, removable media device 1066, etc.

Display 1072 is configured to display the user interfaces described herein. Keyboard 1068, mouse 1070, removable media device 1066, and other peripherals are coupled to I/O interface 1060 in order to exchange information with processor 1054. It should be appreciated that data to and from external devices may be communicated through I/O interface 1060. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 1064. Network 1064 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the present disclosure.

What is claimed is:

1. A method, comprising:
   detecting, by a processor, user interaction on a property page, the property page used in accessing a user account of a user;
   analyzing, by the processor, user interaction at the property page to obtain contextual information of the user interaction;
   examining, by the processor, user profile data of the user to identify a field of information that needs to be updated, the identified field of information related to the contextual information obtained from the user interaction;
   generating, by the processor, a query for the field of information that needs updating, the query constructed using the contextual information obtained from the analysis, the query presented in a user interface at a client device used to access the user account, for user action; and
   updating, by the processor, the field of information within the user profile data with information obtained from the user interface based on the user action to the query, wherein the updating adds to the user profile data of the user.

2. The method of claim 1, wherein the user interaction is associated with the user accessing the property page or is associated with other users providing content for the property page.

3. The method of claim 1, wherein the query is presented in a user interface on the property page.

4. The method of claim 1, wherein the user interaction is obtained from one or more properties hosted within an entity that hosts the property page.

5. The method of claim 1, wherein the user interaction is obtained from one or more properties hosted on entities other than the entity that hosts the property page, the user interactions obtained using an application programming interface (API).

6. The method of claim 5, wherein the contextual information collected through the API includes information that is made public by the user.

7. The method of claim 5, wherein the contextual information collected through the API includes information shared by the user.

8. The method of claim 1, wherein presenting the query on the user interface further includes presenting one or more incentives to a user for responding to the query.

9. The method of claim 8, wherein the incentives are provided as any one of a discount offer, information related to a promotional event, information related to an event corresponding to one or more user profile data, product discount, monetary offer, or any combinations thereof.

10. The method of claim 1, wherein updating further includes, validating the information obtained from the user action at the user interface prior to updating the user profile data, wherein the validation is performed using attributes of the client device or information from the user profile data.

11. A method, comprising:

analyzing, by a processor, social interaction content from a social media stream associated with a user account to identify contextual information related to the social interaction content;

determining, by the processor, a field within a profile of a user that needs to be filled, the user associated with the user account, wherein the field is related to contextual information obtained from the analysis of the social interaction content;

generating, by the processor, a user interface with a suggestion related to the field, based on the analysis, the suggestion including contextual information of the social interaction content and a suggested user action to be performed for the suggestion, the generated user interface presented for user action; and updating, by the processor, the field within the user's profile with information from the user interface, based on the user action to the suggestion, the updating adds to the user's profile.

12. The method of claim 11, wherein the user is authenticated using an authentication interface, the user provided access to the user account on a social network upon successful user authentication.

13. The method of claim 11, wherein the social interaction content is obtained from one or more properties hosted within an entity hosting a social network.

14. The method of claim 11, wherein the social interaction content is obtained from one or more properties hosted on entities other than an entity hosting a social network, the social interaction content obtained using an application programming interface (API).

15. The method of claim 14, wherein the one or more properties hosted on different entities are accessed through a property within the entity hosting a social network.

16. The method of claim 14, wherein the properties include any one of an application, a service or a webpage used for any one of exchanging, receiving, generating or accessing the social interaction content.

17. The method of claim 14, wherein the social interaction content collected through the API includes content that is made public by the user.

18. The method of claim 14, wherein the social interaction content collected through the API includes information shared by the user.

19. A non-transitory computer-readable medium having program instructions that, when executed by a processor, cause the processor to perform operations comprising:

detecting, by the processor, user interaction on a property page, the property page used in accessing a user account of a user;

analyzing, by the processor, user interaction at the property page to obtain contextual information of the user interaction;

examining, by the processor, user profile data of the user to identify a field of information that needs to be updated, the identified field of information related to the contextual information obtained from the user interaction;

generating, by the processor, a query for the field of information that needs updating, the query constructed using the contextual information obtained from the analysis, the query presented in a user interface at a client device used to access the user account, for user action; and updating, by the processor, the field of information within the user profile data with information obtained from the user interface based on the user action to the query, wherein the updating adds to the user profile data of the user.

20. The non-transitory computer readable medium of claim 19, wherein for the operations further comprise presenting one or more incentives to a user for responding to the query, wherein the incentives are provided as any one of a discount offer, information related to a promotional event, information related to an event corresponding to one or more user profile data, product discount, monetary offer, or any combinations thereof.

* * * * *